Feb. 11, 1947. E. E. WALLACE 2,415,616
TIRE AND MOUNTING THEREFOR
Filed May 7, 1943 2 Sheets-Sheet 1

INVENTOR.
Edward E. Wallace
BY Geo. B. Potts
attorney

Feb. 11, 1947. E. E. WALLACE 2,415,616
TIRE AND MOUNTING THEREFOR
Filed May 7, 1943 2 Sheets-Sheet 2
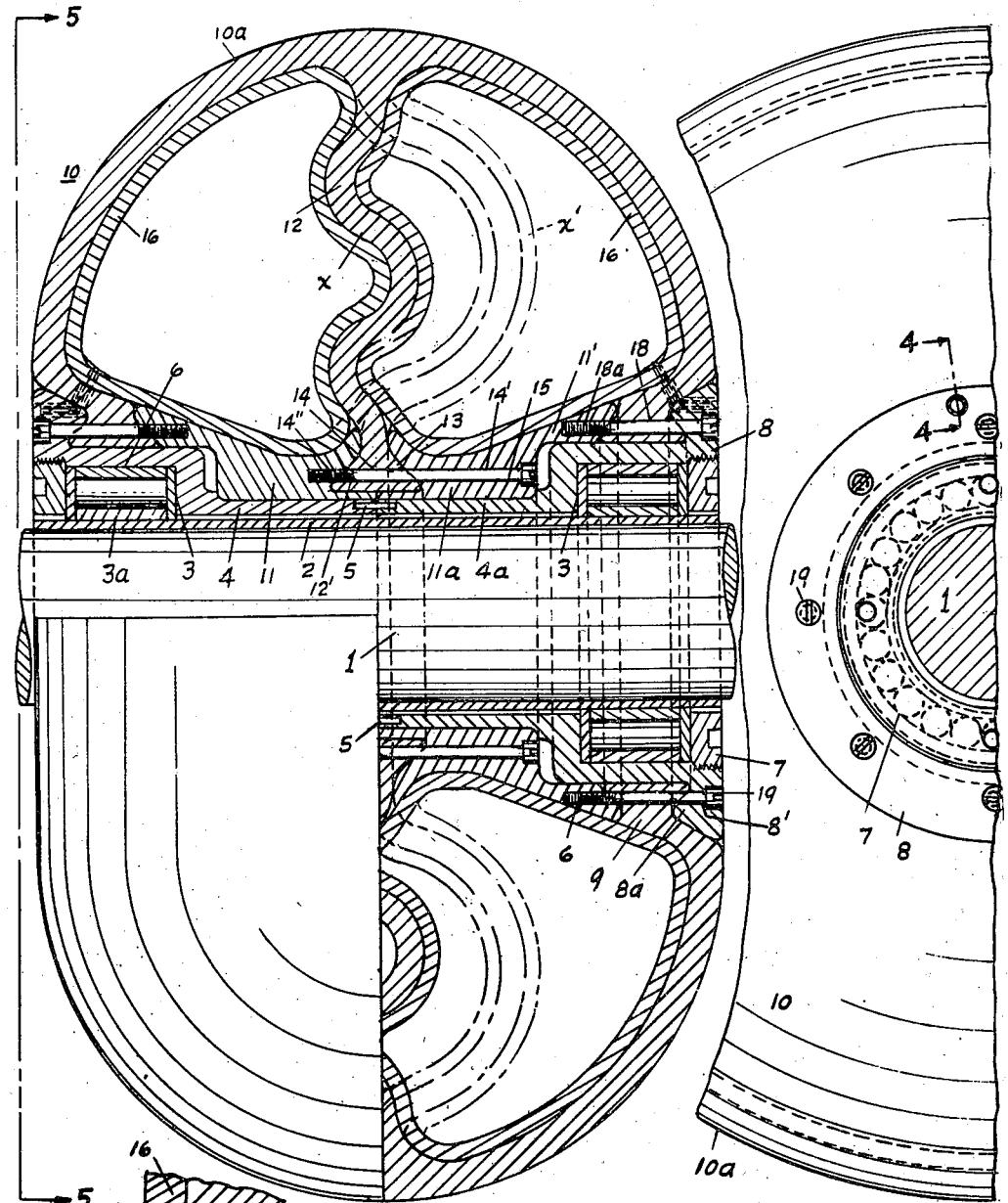
FIG. 3
FIG. 5
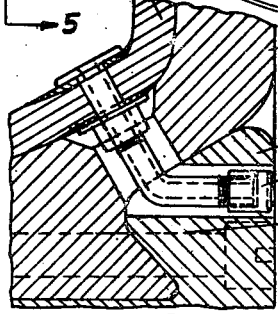
FIG. 4
INVENTOR.
Edward E. Wallace
BY Geo. B. Pitts
Attorney Patented Feb. 11, 1947

2,415,616

UNITED STATES PATENT OFFICE 2,415,616

TIRE AND MOUNTING THEREFOR

Edward E. Wallace, Cleveland Heights, Ohio

Application May 7, 1943, Serial No. 485,979

3 Claims. (Cl. 152—339)

This invention relates to a wheel construction having a pneumatic tire. The wheel is, for illustrative purposes, shown mounted on an axle which in turn is mounted on the outer end of a supporting member for an airplane such as shown in my co-pending application filed April 14, 1943, Serial No. 482,991.

This form of mounting embodies certain improvements, particularly where braking means are incorporated therein, as herein disclosed, but in the broader phase of the invention my improved tire may be adapted to wheels for trucks, automobiles and other types of vehicles.

One object of the invention is to provide an improved tire having a plurality of inner tubes so mounted that either tube may be inflated or deflated independently of the other tube.

Another object of the invention is to provide an improved tire comprising a casing and inner tubes therein capable of being inflated or deflated independently, the casing having a wall between the tubes arranged to support either tube in the event the other tube becomes partially or completely deflated, or a portion of the tire casing becomes damaged and impairs the stability of the tube adjacent the damaged portion.

A further object of the invention is to provide in a wheel, an improved pneumatic tire consisting of a casing and a pair of inner tubes and a mounting therefor.

Other objects of the invention will be apparent to those skilled in the art to which my invention relates from the following description taken in connection with the accompanying drawings, wherein Fig. 1 is a view, partly in elevation and partly in section, of a wheel having a tire embodying my invention.

Fig. 3 is a view, partly in elevation and partly in section, showing a modified form of construction.

Fig. 4 is a fragmentary sectional view on the line 4—4 of Fig. 5, enlarged.

Fig. 5 is a fragmentary side view of parts shown in Fig. 3.

Figures 1 to 5, inclusive, illustrate improved tire constructions, each adapted to be used for or incorporated in the wheels of a vehicle or the landing gears of an airplane, but for illustrative purposes the support for the wheel herein shown forms part of a movable retractile member for an airplane, as shown in my aforesaid co-pending application.

Each of these tire constructions comprises a casing or carcass having therein two inner tubes, these parts being so related and constructed that either tube may be inflated or deflated independently of the other tube, and accordingly if either tube is punctured or becomes deflated for any reason, or a blow-out or damage to the casing occurs, the other tube will maintain the carcass in a partially expanded position, so that the operability of the wheel will not be seriously impaired.

Figure 1:
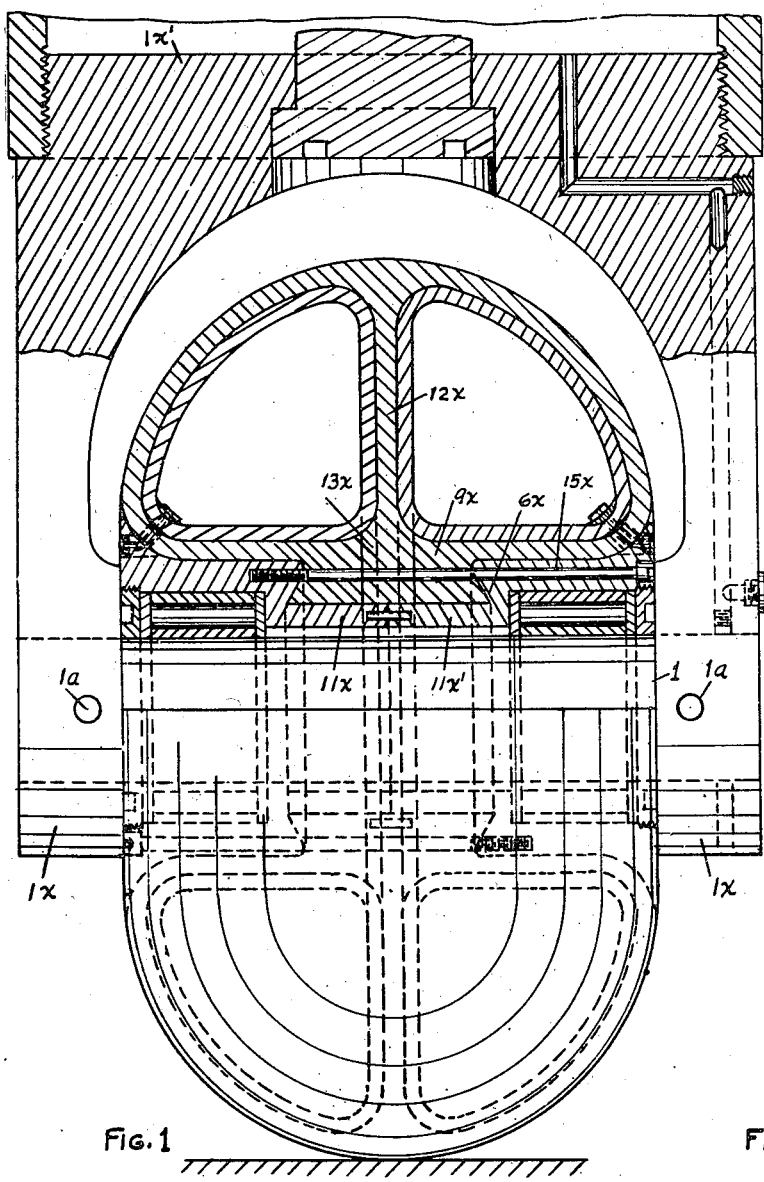
Figure 2:
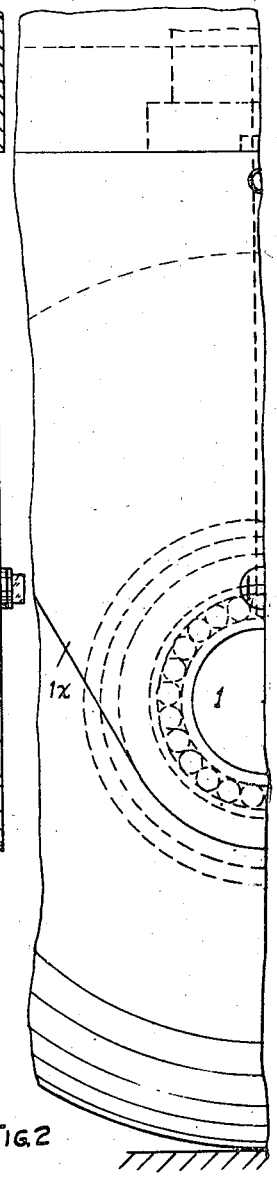
Fig. 2 is a fragmentary side elevation of parts shown in Fig. 1.

In these views, I indicates the wheel axle supported at its opposite ends in the depending arms $1x$ of a fitting $1x'$ (see Fig. 1) suitably secured to the outer end of a retractile member, the axle being preferably fixed to the arms by suitable pins $1a$ (see Fig. 1).

Referring particularly to Figs. 3, 4 and 5, the axle I is surrounded by a sleeve 2 with which parts of suitable anti-friction bearing cages 3 and the inner bearing races 3a thereof (the bearings being preferably of the roller type) engage. The wheel consists of two annular elements 4, 4a, in side by side relation and connected together by a plurality of dowel pins 5 (two only being shown). The walls of the annular elements, adjacent their outer portions are off-set radially to form annular chambers 6 to accommodate the bearing cages 3, the outer bearing races having engagement with the side walls of the chambers. The side wall of each chamber 6 adjacent its outer end is (a) provided internally with screw threads to take a ring nut 7 which is tightened against the adjacent cage 3 to secure it in the adjacent chamber 6, and (b) extended radially circumferentially, as shown at 8, to provide an inwardly extending rib 8a, which laps over and has interlocking engagement with the annular bead 9 on the adjacent side wall of a tire carcass 10. The inner side portions of the annular elements 4, 4a, and end walls of the chamber 6 form seats for annular keying elements 11, 11a, which cooperate with the ribs 8a to lock the carcass 10 in position around the annular members 4, 4a. As shown, the carcass 10 comprises a tread portion 10a, which may be provided with suitable capping material (not shown), side walls having the beads 9 and a central web 12 extending radially inwardly from the tread portion 10a throughout its circumference. The inner peripheral portion of the web 12 is enlarged laterally on its opposite sides throughout its circumference, as shown at 12', which enlargement fits into a recess 13 formed by cut-aways in the opposed or inner ends of the keying elements 11, 11a. At spaced points throughout its circumference the enlargement 12' is formed with a plurality of spaced transverse through openings 14 each in registry with a through opening 14' formed in one of the keying elements 11, 11a, whereby countersunk screws 15 may be mounted in the openings 14 and 14' and threaded into threaded openings 14" formed in the other keying element to secure these parts together with the enlargement 12' locked between them. Each keying element 11, 11a throughout its circumference is extended outwardly, as shown at 11', over the side wall of the adjacent chamber 6, for engagement with the adjacent bead 9, whereby the keying element and bead may form a suitable seat for the walls of an inner tube 16. As shown, the web 12, keying elements 11, 11a, beads 9 and carcass side walls and tread portion thereof form cavities for the inner tubes 16, each of which may be inflated or deflated through a suitable valve in a nipple 17. By preference, each wall 8 is formed throughout its circumference with a plurality of openings 8' each in registry with a through opening 18 formed in the adjacent bead 9, so that countersunk screws 19 extending through these openings may be threaded into openings 18a formed in the adjacent extensions 11' to secure the bead 9 between these parts. As will be understood from Fig. 3, the radial length of the web 12 is greater than the distance from the tread portion 10a of the carcass 10 to the wheel rim, when the tubes 16 are inflated to their normal pressure.

Accordingly, when the tubes 16 are inflated, the intermediate portion of the web 12 between the keying elements 11, 11a, and the carcass tread is compressed into one or more folds to compensate for this excess length, since the carcass 10 cannot be further expanded, but in the event one tube 16 (for example the tube at the right as viewed in Fig. 3) is punctured or otherwise becomes deflated, this excess length of the web, due to the pressure in the other tube, will be expanded laterally, as shown at x' in dotted lines (Fig. 3), so that the said other inner tube 16 will prevent total collapse of the carcass but permit the wheel to operate under slightly impaired conditions.

In the form of construction shown in Fig. 1, the web 12 has a radial length substantially equal to the distance from the tread portion of the carcass to the annular members 4, 4a, so that in the event one tube 16 becomes deflated the expansion of the web, due to the pressure in the other tube, will be very limited.

Fig. 1 shows a different form of carcass and mounting therefor. In this illustrated arrangement the elements 11x, 11x', are similar to the annular elements 11, 11a, except that the end walls which form the chambers 6 are formed with recesses 6x throughout their circumference, to provide an interlocking engagement with the beads 9x, and the side walls of the carcass are extended inwardly so that the terminating beads 9x thereon engage with the enlargement 13x on the carcass web 12x. The enlargement 13x is formed throughout its circumference with a plurality of through openings each in registry with a through opening formed in one of the elements 11x, 11x', which registering openings accommodate countersunk screws 15x, the latter being threaded into alined openings formed in the other element to secure these parts together.

From the foregoing description it will be noted that in the event one of the inner tubes becomes deflated, or where the tire casing becomes damaged which results immediately or later in a blow-out of one of the tubes, the casing will be maintained expanded sufficiently by the other tube to permit operation of the wheel, at least to a limited extent, and thus prevent complete collapse of the casing as well as avoid a serious accident.

To those skilled in the art to which my invention relates many changes in construction and widely differing embodiments and applications of the invention will suggest themselves without departing from the spirit and scope of the invention. My disclosures and the description herein are purely illustrative and are not to be in any sense limiting.

What I claim is:

1. A tire and mounting therefor comprising a pair of annular members in side-by-side relation, the outer edge of each said member being provided with an outwardly extending wall the inner face of which is formed with a circumferential recess, a tire casing having a tread portion and side walls terminating in circumferential beads seated in said recesses and an intermediate flexible web extending inwardly from said tread portion circumferentially of said casing, keying elements supported on said annular members at opposite sides of said web and between it and said beads, means securing said keying elements to said web, means securing each of said outwardly extending walls, the adjacent bead and keying element together, and an inner inflatable tube at either side of said intermediate web enclosed by the adjacent side wall.

2. In a tire and mounting therefor, the combination with an axle, of a tire comprising a casing having inturned side walls terminating in circumferential beads, an intermediate flexible web extending inwardly from the tread portion of said casing circumferentially thereof and an inflatable tube mounted at either side of said web and between it and the adjacent side wall, a mounting for said casing surrounding said axle and consisting of a pair of annular members in side-by-side relation and terminating at their outer ends substantially flush with the side walls of said casing when the tubes therein are inflated to support said side walls and beads, the outer portion of each member being off-set radially outwardly to form an annular recess the end wall of which forms a seat for one of said beads, and means connecting said beads, web and annular members together.

3. A combination as claimed in claim 2 wherein the beads engage said annular members between the off-sets thereof and the connecting means consist of a threaded element engaging said members, beads and web.

EDWARD E. WALLACE.

REFERENCES CITED

The following references are of record in the file of this patent:

UNITED STATES PATENTS

| Number | Name | Date |
| --- | --- | --- |
| 783,793 | Miller | Feb. 28, 1905 |
| 2,105,860 | Hruska | Jan. 18, 1938 |
| 2,094,065 | Frank | Sept. 28, 1937 |
| 2,296,671 | Hollerith | Sept. 22, 1942 |
| 1,404,532 | Lehr | Jan. 24, 1922 |
| 2,027,282 | Mason | Jan. 7, 1936 |
| 743,309 | Miller | Nov. 3, 1903 |
| 893,655 | Rempes | July 21, 1908 |
| 1,239,506 | Moore | Sept. 11, 1917 |

FOREIGN PATENTS

| Number | Country | Date |
| --- | --- | --- |
| 738,826 | French | of 1932 |
| 11,628 | Britain | of 1899 |
| 18,386 | Britain | of 1909 |